(12) United States Patent
Kumar et al.

(10) Patent No.: US 10,878,566 B2
(45) Date of Patent: Dec. 29, 2020

(54) AUTOMATIC TEETH WHITENING USING TEETH REGION DETECTION AND INDIVIDUAL TOOTH LOCATION

(71) Applicant: Adobe Inc., San Jose, CA (US)

(72) Inventors: Abhishek Kumar, Bihar (IN); Reetesh Mukul, Bangalore (IN); Eede Jaya Durga Bhargav, Bangalore (IN); Bhakti Ramnani, Madhya Pradesh (IN)

(73) Assignee: Adobe Inc., San Jose, CA (US)

( * ) Notice: Subject to any disclaimer, the term of this patent is extended or adjusted under 35 U.S.C. 154(b) by 51 days.

(21) Appl. No.: 16/391,883

(22) Filed: Apr. 23, 2019

(65) Prior Publication Data

US 2020/0342586 A1 Oct. 29, 2020

(51) Int. Cl.
*G06T 7/00* (2017.01)
*G06T 5/50* (2006.01)
(Continued)

(52) U.S. Cl.
CPC .......... *G06T 7/0012* (2013.01); *A61C 19/066* (2013.01); *G06T 5/50* (2013.01); *G06T 7/11* (2017.01); *G06T 7/12* (2017.01); *G06T 7/13* (2017.01); *G06T 7/136* (2017.01); *G06T 7/143* (2017.01); *G06T 7/174* (2017.01); *G06T 2207/10024* (2013.01); *G06T 2207/20081* (2013.01); *G06T 2207/20084* (2013.01);
(Continued)

(58) Field of Classification Search
CPC ......... G06T 7/0012; G06T 7/136; G06T 7/12; G06T 7/143; G06T 7/11; G06T 7/13; G06T 7/174; G06T 5/50; G06T 2207/10024; G06T 2207/20081; G06T 2207/20084; G06T 2207/20132; G06T 2207/20216; G06T 2207/30036; A61C 19/066

See application file for complete search history.

(56) References Cited

U.S. PATENT DOCUMENTS

2014/0185931 A1* 7/2014 Aoki .................. G06T 5/40
382/167
2019/0147321 A1* 5/2019 Miyato .............. G06T 7/143
382/157
(Continued)

OTHER PUBLICATIONS

Borji,"Human-like Clustering with Deep Convolutional Neural Networks", Dec. 11, 2017, 12 pages.
(Continued)

*Primary Examiner* — David F Dunphy
(74) *Attorney, Agent, or Firm* — SBMC

(57) ABSTRACT

An automatic teeth whitening system analyzes digital content and detects at least one teeth region in the digital content. A teeth region refers to a region or portion of the digital content that includes teeth (e.g., human teeth), and the teeth region detection includes identifying each pixel that displays part of the teeth using instance segmentation. The automatic teeth whitening system also finds the visual structure of each tooth in the teeth region using instance contours specific to the tooth. After finding the teeth region and the visual structure of each tooth in the teeth region, a whitening process is applied to the teeth to whiten them. The whitening of the teeth is performed automatically—manual steps by the user of selecting teeth regions and coloring the teeth in those regions are avoided.

20 Claims, 11 Drawing Sheets

(51) Int. Cl.
*G06T 7/11* (2017.01)
*G06T 7/174* (2017.01)
*G06T 7/136* (2017.01)
*G06T 7/12* (2017.01)
*G06T 7/13* (2017.01)
*G06T 7/143* (2017.01)
*A61C 19/06* (2006.01)

(52) U.S. Cl.
CPC ............... *G06T 2207/20132* (2013.01); *G06T 2207/20216* (2013.01); *G06T 2207/30036* (2013.01)

(56) References Cited

U.S. PATENT DOCUMENTS

2019/0180443 A1* 6/2019 Xue ................... G06K 9/66
2019/0295223 A1* 9/2019 Shen .................. G06K 9/6256

OTHER PUBLICATIONS

He,"Mask R-CNN", In Proceedings of the IEEE International Conference on Computer Vision, Jan. 24, 2018, 12 pages.
Hsu,"Neural Network-based Clustering Using Pair-wise Constraints", Apr. 26, 2016, 12 pages.
Isola,"Image-to-Image Translation with Conditional Adversarial Networks", 2017 IEEE Conference on Computer Vision and Pattern Recognition (CVPR), Nov. 22, 2017, 17 pages.
Lin,"Focal Loss for Dense Object Detection", IEEE International Conference on Computer Vision (ICCV), 2017, Oct. 2017, 9 pages.
Xie,"Holistically-Nested Edge Detection", Oct. 4, 2015, 10 pages.
Zhu,"Unpaired Image-to-Image Translation using Cycle-Consistent Adversarial Networks", Nov. 15, 2018, 18 pages.

* cited by examiner

Cropped Portion Of Digital Content 204

Tooth Segmentation Drawing 206

802

806

Intensity Map 708

804

Cropped Portion Of Digital Content 204

Intensity Map 708

Intermediate Whitened Teeth 710

Whitened Teeth Digital Content 208

AUTOMATIC TEETH WHITENING USING TEETH REGION DETECTION AND INDIVIDUAL TOOTH LOCATION

BACKGROUND

As computer technology has advanced computers have become increasingly commonplace in our lives and have found a wide variety of different uses. One such use is creating and editing digital content, where users can generate and edit digital content such as digital pictures and video in a variety of different manners. For example, digital content editing programs can be used to remove red-eye from digital pictures, to increase or decrease the brightness of a digital picture or video, to increase or decrease the contrast of a digital picture or video, to hide blemishes or scars on people in a digital picture, and so forth.

One type of digital content editing that users desire to perform is whitening the teeth of people in digital content. Current solutions for teeth whitening provided by digital content editing programs involve a series of manual steps performed by the user. First, the user needs to provide a carefully selected teeth region(s) using some selection or masking tool. Then, the user must apply a series of edits, such as reducing the hue of yellow color, adjusting the brightness and exposure, etc., followed by applying some softening effect over the edges between the teeth and gums (e.g., applying some Gaussian blur). The user must take care in applying such edits to ensure that adjustments do not spill-over to non-teeth regions. It takes the user a significant amount of time and effort to whiten teeth for even a single person in a digital picture. If there are multiple people in the digital picture, the user must repeat this manual process for each person in the digital picture. If the digital content is digital video, the user must repeat this manual process for each person in each frame of the digital video.

Conventional solutions for teeth whitening thus have various drawbacks. One such drawback is the time and effort required for the user to perform all the steps to manually whiten teeth in digital content. Another such drawback is the experience and knowledge a user must possess in order to perform all the steps to manually whiten teeth and produce a visually appealing result. These drawbacks to conventional solutions for teeth whitening can lead to user frustration with their computers and digital content editing programs.

SUMMARY

To mitigate the drawbacks of conventional teeth whitening solutions, an automatic teeth whitening system as implemented by a computing device is described to automatically whiten teeth in digital content. First digital content is obtained and a teeth region mask that identifies a teeth region of the first digital content that includes teeth of a person is identified. Using the first digital content, where each individual tooth is located in the teeth region is determined. An intensity map that identifies an intensity of each individual tooth in the teeth region is created using the first digital content. Second digital content that includes a whitened version of the teeth of the person is generated using a first machine learning system. Generating the second digital content includes generating, for at least one individual tooth in the teeth region, colors of pixels of the at least one individual tooth based on a color of each individual tooth in the first digital content as well as the intensity of the at least one individual tooth in the intensity map. The generated second digital content is displayed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
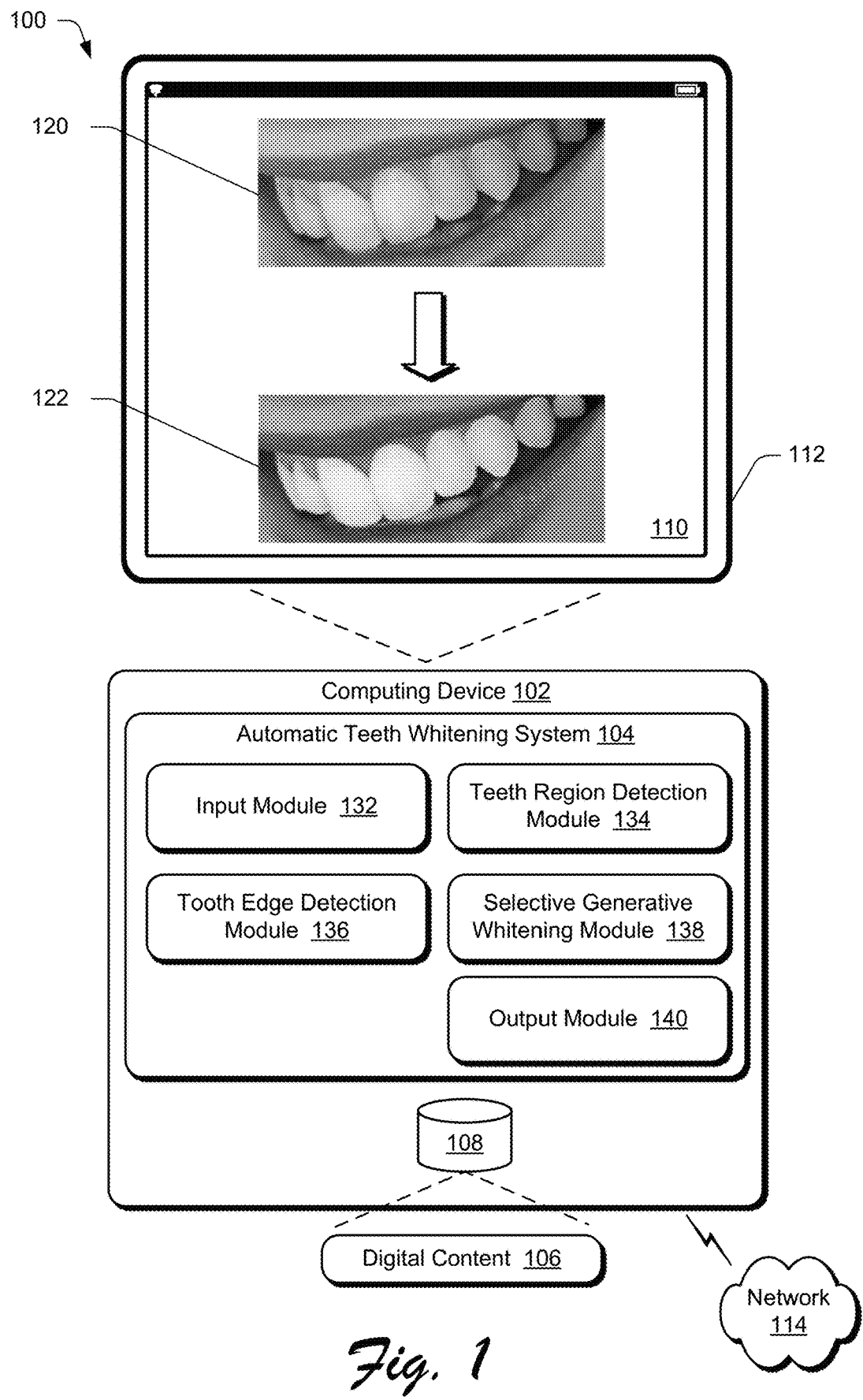
FIG. 1 is an illustration of a digital medium environment in an example implementation that is operable to employ the automatic teeth whitening using teeth region detection and individual tooth location described herein.

Current solutions for teeth whitening provided by digital content editing programs involve a series of manual steps performed by the user. First, the user needs to provide a carefully selected teeth region(s) using some selection or masking tool. Then, the user must apply a series of edits, like reducing the hue of yellow color, adjusting the brightness and exposure, etc., followed by applying some softening effect over the edges between the teeth and gums (e.g., applying some Gaussian blur). It takes the user a significant amount of time and effort to whiten teeth for even a single person in a digital picture. If there are multiple people in the digital picture, the user must repeat this manual process for each person in the digital picture. If the digital content is digital video, the user must repeat this manual process for each person in each frame of the digital video.

To overcome these challenges, an automatic teeth whitening system analyzes digital content for teeth, and automatically whitens teeth in the digital content. Whitening teeth refers to making teeth look whiter, for example so they have less yellowness in them. Generally, in one or more implementations the automatic teeth whitening system analyzes the digital content and detects at least one teeth region in the digital content. A teeth region refers to a region or portion of the digital content that includes teeth (e.g., human teeth), and the teeth region detection includes identifying each pixel that displays part of the teeth using instance segmentation. The automatic teeth whitening system also finds the visual structure of each tooth in the teeth region using instance contours specific to the tooth. After finding the teeth region and the visual structure of each tooth in the teeth region, a whitening process is applied to the teeth to whiten them. The whitening of the teeth is performed automatically—manual steps by the user of selecting teeth regions, surrounding each tooth with a rectangle, and coloring the teeth in those regions are avoided. Furthermore, the automatic teeth whitening system can be performed on multiple instances of teeth in a single digital still image (e.g., a digital picture), as well as in multiple different images in a collection of digital still images or frames of digital video.

More specifically, the automatic teeth whitening system receives or otherwise obtains digital content as an input to the automatic teeth whitening system. The digital content refers to digital images, such as digital pictures (still images) or digital video.

One or more teeth regions in the digital content are detected. A teeth region refers to a set of at least one tooth shown by an individual in the digital content and that is visible to a viewer of the digital content. In one or more implementations, a teeth region mask that is a binary mask of where the detected teeth region is generated, and a cropped region of the digital content where the teeth region is located. The cropped region can be, for example, a bounding box around the teeth region.

The teeth region can be detected by identifying every pixel in the digital content associated with teeth using instance segmentation techniques. Instance segmentation refers to detecting and delineating each distinct object of interest in an image.

In one or more implementations, a teeth region mask and a cropped region of the digital content where the teeth region is located are generated using a machine learning system, such as a Mask region convolutional neural network (R-CNN). The Mask R-CNN includes multiple fully-convolutional neural networks that receive digital content as an input and generate the teeth region mask and the cropped region of the digital content where the teeth region is located, which is a bounding box around the teeth region mask. The machine learning system is trained to generate the teeth region mask and the bounding box for the teeth region mask. The machine learning system is trained, for example, on a set of training images that include teeth enclosed in a polygon, and a bounding box around those teeth. A sample of points corresponding to the boundary of the polygon is taken, making sure to exclude gingiva or empty regions (e.g., regions that are dark because of missing teeth, because of a slight opening of the mouth or lips, and so forth). The machine learning system is trained, for example, by updating weights of filters in the fully-convolutional neural networks of the machine learning system to minimize the loss between the known teeth regions and teeth region bounding boxes for the training images generated by the machine learning system for the training images, and the loss between the known teeth regions and the teeth region bounding boxes generated by the machine learning system for the training images.

The machine learning system is trained using four different loss functions, referred to as mask loss, regression loss, classification loss, and teeth pixel gradient loss. The mask loss is a binary cross-entropy loss and compares, for an image in a set of training images, how close the predicted mask generated by the machine learning system is to the ground truth for the teeth region mask for the image. The regression loss is a binary cross-entropy loss and compares, for an image in the set of training images, how close the bounding box generated by the machine learning system is to the ground truth bounding box for the image. The classification loss is a binary cross-entropy loss and compares, for an image in the set of training images, how close a class label generated by the machine learning system is for a candidate bounding box to the ground truth class label for the candidate bounding box. The machine learning system generates a class for objects it analyzes, such as a class of "teeth" or "not teeth".

The teeth pixel gradient loss is based on a teeth pixel gradient value, which measures the gradient of probability and the Hessian at points in the candidate bounding box. The teeth pixel gradient loss is the difference between the teeth pixel gradient value calculated over the teeth region mask generated by the machine learning system and the teeth pixel gradient value of the ground truth teeth region mask.

Edges of individual teeth are detected within each teeth region, the outer layout corresponding to each tooth in the teeth region being detected, which provides the tooth's shape. A tooth segmentation drawing can be generated that identifies where each individual tooth is in the teeth region.

In one or more implementations, a boosted cropped portion of digital content is generated. In situations in which two teeth are tightly packed together, or the gingiva between two teeth is thin, it can be harder to detect the boundary between the two teeth. Pixels that have a high probability of being at these boundaries are identified, and the intensity of those identified pixels reduced so that a machine learning system can more easily detect the boundaries between teeth.

The boosted cropped portion of digital content can be quantized and provided to a machine learning system. The machine learning system can be implemented using various different machine learning techniques, such as a neural network based holistic edge detector. A neural network based holistic edge detector can perform image-to-image prediction by means of a deep learning model that leverages fully-convolutional neural networks and deeply-supervised nets. The neural network based holistic edge detector automatically learns rich hierarchical representations (guided by deep supervision on side responses) to resolve the ambiguity in edge and object boundary detection.

In one or more implementations, the neural network based holistic edge detector is trained to generate a tooth segmentation drawing using a set of training images that are tooth segmentation drawings of portions of digital content that include teeth regions. The machine learning system is trained, for example, by updating weights of filters in the fully-convolutional neural networks of the machine learning system to minimize the loss between the known teeth edges in the set of training images and the tooth segmentation drawings generated by the neural network based holistic edge detector.

The teeth within each teeth region are automatically whitened, and the whitened teeth are output as whitened teeth digital content. As part of the whitening process, an intensity map can be generated by filling each segment in the tooth segmentation drawing (each segment corresponding to a tooth) with the average intensity of pixels inside that segment in the cropped portion of digital content. A machine learning system can be used to generate intermediate whitened teeth from the cropped portion of digital content. The intermediate whitened teeth can be combined with the cropped portion of digital content based on the average intensity values of the corresponding segments. Thus, rather than giving each tooth in the teeth region the same intensity, each tooth in the teeth region can be whitened based on the average intensity of pixels that make up that tooth in the cropped portion of digital content.

In one or more implementations, the intermediate whitened teeth are generated using a machine learning system such as a generative adversarial network (GAN). The GAN receives the cropped portion of digital content as an input, and transforms that input from a domain of non-white teeth to a domain of white teeth, and outputs the transformed cropped portion of digital content as the intermediate whitened teeth. The GAN is trained using two sets of training data. Each set is also referred to as a domain. One domain is the source domain and can include images of teeth that are non-white, such as yellow teeth, dirty teeth, teeth with crowns, teeth with caps, and so forth. The other domain is the target domain and can include images of all white and clean teeth. The GAN is trained to translate an image A from the source domain to the target domain as translated image B so that the translated image B is indistinguishable from the training images in the target domain using a forward cycle-consistency loss. The GAN is further trained to translate the translated image B back into the source domain so that this translated-back image C is the same as the image A using a backward cycle-consistency loss. Training the GAN using these two cycle-consistency losses preserves structural features in the teeth as well as the domain (e.g., either white or non-white), so the intermediate whitened teeth look the same as the teeth in the cropped portion of digital content except whitened.

The whitened teeth digital content can be output in various different manners, such as displaying the whitened teeth digital content, communicating the whitened teeth digital content to a different system or device, storing the whitened teeth digital content in a storage device, and so forth.

The techniques discussed herein provide for automatic whitening of people's teeth in digital content. These techniques alleviate users of the burden of expending a significant amount of time and effort to perform all the steps to manually whiten teeth in digital content. These techniques further allow users to whiten people's teeth in digital content despite having little or no experience and knowledge of how to do so. This reduces the amount of time users are on their computers, reducing computer resource usage such as by conserving power.

Furthermore, the techniques discussed herein allow for automatic whitening of people's teeth in digital content in situations where it is otherwise not feasible for teeth whitening to be performed. For example, on computing devices with small displays, such as digital cameras or wearable devices, the small size of the display may make it infeasible for a user to interact with the device in order to manually whiten people's teeth. By way of another example, on computing devices without certain input devices (e.g., computing devices lacking a stylus or mouse), the lack of such input devices can make it infeasible for a user to interact with the device in order to manually whiten people's teeth.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the automatic teeth whitening using teeth region detection and individual tooth location described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including an automatic teeth whitening system 104. The automatic teeth whitening system 104 is illustrated as being implemented as a standalone system. Additionally or alternatively, the automatic teeth whitening system 104 can be implemented as part of another system or program, such as a digital content editing program, a digital content capture program, and so forth.

The automatic teeth whitening system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. The digital content 106 refers to digital images, such as digital still images (e.g., digital pictures) or digital video. The storage 108 can be any of a variety of different types of storage, such as random access memory (RAM), Flash memory, solid state drive, magnetic disk drive, and so forth. Although illustrated as implemented locally at the computing device 102, functionality of the automatic teeth whitening system 104 may also be implemented in whole or part via functionality available via the network 114, such as part of a web service or "in the cloud."

The automatic teeth whitening system 104 automatically whitens teeth in digital content 106. For example, the automatic teeth whitening system 104 receives as an input digital content including yellowish teeth 120, and generates digital content including whitened teeth 122. An example of functionality incorporated by the automatic teeth whitening system 104 to process the video content 106 is illustrated as an input module 132, a teeth region detection module 134, a tooth edge detection module 136, a selective generative whitening module 138, and an output module 140.

The input module 132 implements functionality to receive or otherwise obtain digital content as an input to the automatic teeth whitening system 104. The teeth region detection module 134 implements functionality to detect one or more regions in the obtained digital content that include teeth, each referred to as a teeth region. Typically the teeth region detection module 134 detects a region of digital content that includes a person's teeth, but additionally or alternatively can detect a region that includes teeth of a non-human. The tooth edge detection module 136 implements functionality to detect edges of individual teeth within each teeth region detected by the teeth region detection module 134. The selective generative whitening module 138 implements functionality to automatically whiten the teeth within each teeth region detected by the teeth region detection module 134. The output module 140 implements functionality to output the digital content with whitened teeth, such as by displaying and/or storing the digital content.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Automatic Teeth Whitening System Architecture

Figure 2:
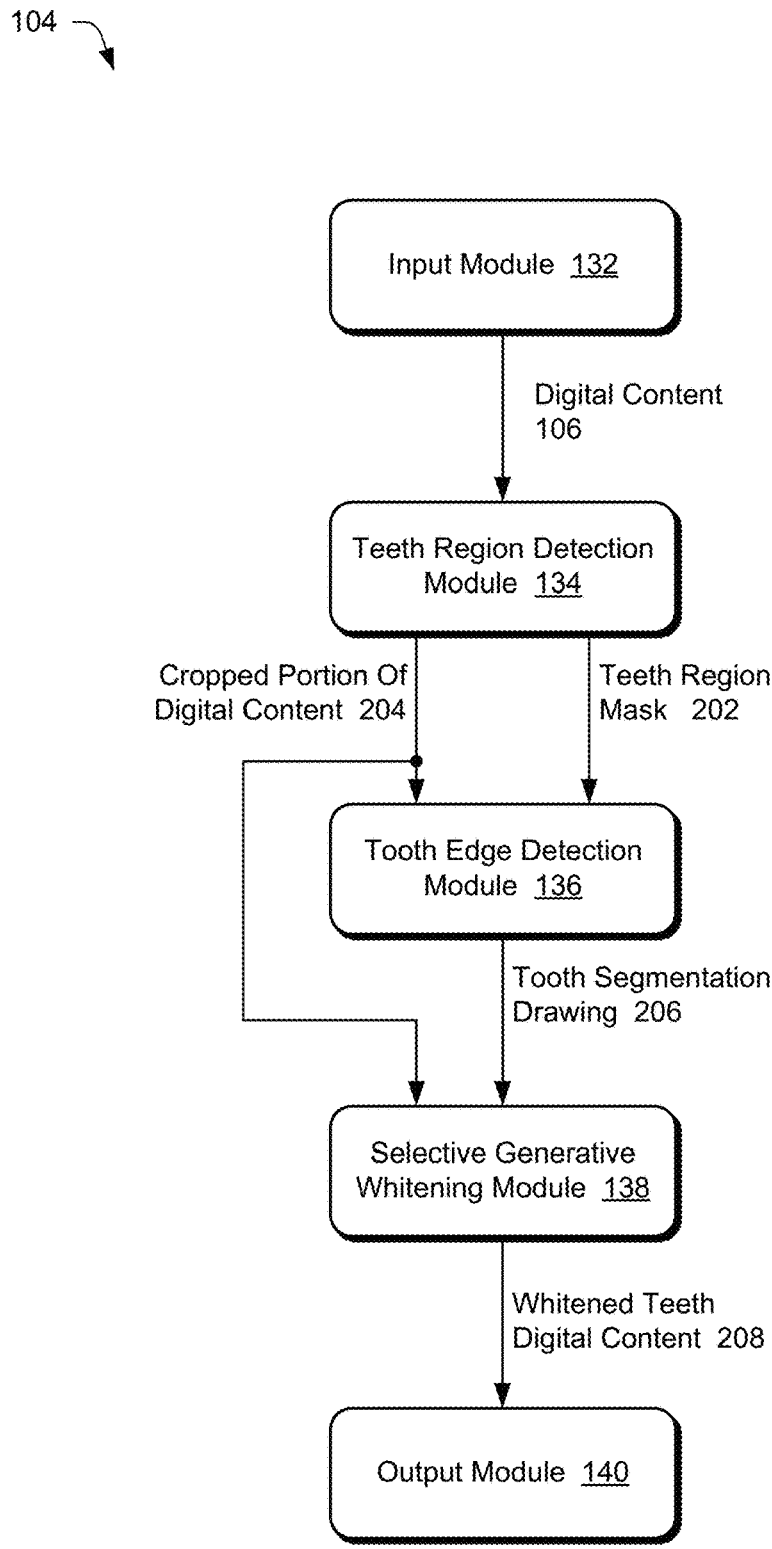
FIG. 2 is an illustration of an example architecture of an automatic teeth whitening system.

FIG. 2 is an illustration of an example architecture of an automatic teeth whitening system 104. The automatic teeth whitening system 104 includes the input module 132, the teeth region detection module 134, the tooth edge detection module 136, the selective generative whitening module 138, and the output module 140. The automatic teeth whitening system 104 obtains digital content, identifies at least one region in the digital content that includes teeth, and generates digital content with the teeth in the at least one region whitened. The automatic teeth whitening system 104 whitens individuals' teeth in digital content automatically—the user of the automatic teeth whitening system 104 need not identify the location(s) of the teeth in the digital content and need not manually apply any coloring to the teeth. Rather, the user can, for example, simply select a "whiten" button and have the teeth in the digital content automatically whitened by automatic teeth whitening system 104.

The input module 132 implements functionality to obtain digital content 106. The digital content 106 refers to digital images, such as digital still images (e.g., digital pictures) or digital video. The input module 132 can obtain the digital content 106 in any of a variety of different manners. For example, the input module 132 can retrieve the digital content 106 from a storage device, the digital content 106 can be streamed or otherwise sent to the input module 132, and so forth.

The input module 132 provides the digital content 106 to the teeth region detection module 134. The teeth region detection module 134 implements functionality to detect one or more regions in the digital content 106 that include teeth, each region being referred to as a teeth region. A teeth region refers to a set of at least one tooth shown by an individual in the digital content 106 and that is visible to a viewer of the digital content 106. Typically the teeth region detection module 134 detects a region of digital content that includes a person's teeth, but additionally or alternatively the teeth region detection module 134 can detect a region that includes teeth of a non-human (e.g., a dog, a horse, etc.).

The teeth region detection module 134 outputs a teeth region mask 202 that is a binary mask of where the detected teeth region is, and a cropped region 204 of the digital content where the teeth region is located. In one or more implementations, the cropped region is a bounding box around the teeth region. The bounding box of a teeth region is a rectangular area in which the teeth region is contained, and is typically the smallest rectangular area that contains all of the teeth region.

The teeth region detection module 134 detects the teeth region by identifying every pixel in the digital content 106 associated with teeth using instance segmentation techniques. Instance segmentation refers to detecting and delineating each distinct object of interest in an image. Any of a variety of different instance segmentation techniques can be used to generate the teeth region.

In one or more implementations, the teeth region detection module 134 includes a machine learning system, which can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

For example, the teeth region detection module 134 can employ one or more convolutional neural networks (CNNs). A CNN is formed from layers of nodes (i.e., neurons) and can include various layers such as an input layer, an output layer, and one or more hidden layers such as convolutional layers, pooling layers, activation layers, fully connected layers, normalization layers, and so forth. One type of CNN is a region-CNN (R-CNN). An R-CNN is a CNN that identifies one or more objects (using one or more bounding boxes) in an image.

Figure 3:
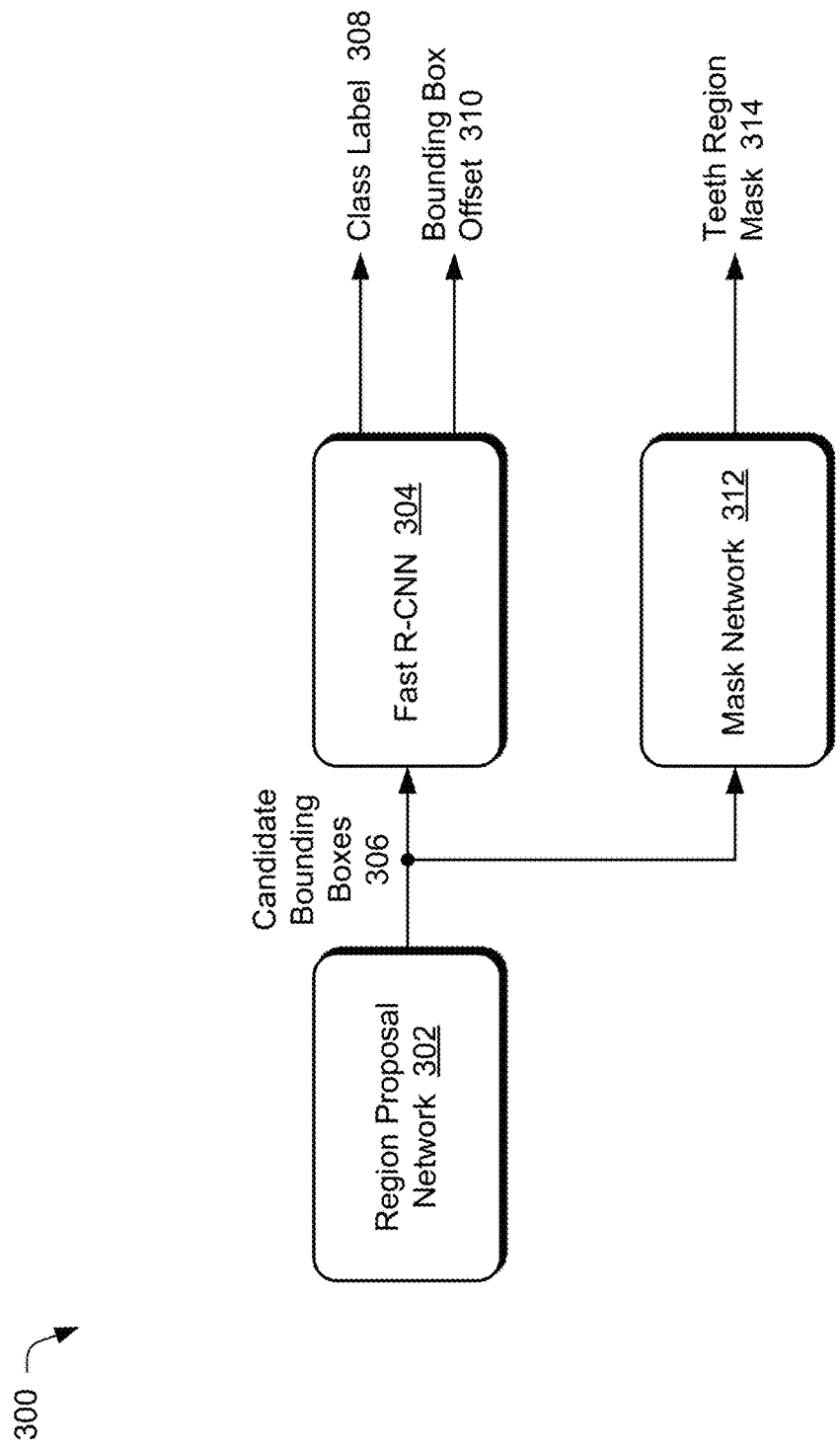
FIG. 3 illustrates an example implementation of a machine learning system included in a teeth region detection module.

FIG. 3 illustrates an example implementation of a machine learning system 300 included in the teeth region detection module 134. In the example of FIG. 3, the machine learning system 300 is implemented as a Mask R-CNN machine learning system, also referred to as simply a Mask R-CNN. The Mask R-CNN includes a region proposal network 302 and a Fast R-CNN network 304. The region proposal network 302 is a first stage of the Mask R-CNN and is a fully-convolutional neural network (also referred to as simply a fully-convolutional network) that simultaneously predicts object bounds and objectness scores at each position, where the objectness scores measure membership to a set of object classes versus being part of the background. The region proposal network 302 generates candidate object bounding boxes 306. Each candidate object bounding box 306 is a bounding box around a candidate object, and each candidate object bounding box is also referred to as a region of interest.

The Fast R-CNN network 304 is a fully-convolutional neural network that extracts features from each candidate object bounding box 306 and performs classification and bounding box regression. The fast R-CNN network 304 generates a class label 308 and a bounding box offset 310 for each candidate object bounding box 306. The class label 308 identifies one of multiple classes that the candidate object is a member of. For example, the class label 308 can identify the candidate object as one of two classes (one for "teeth", the other for "not teeth").

The fast R-CNN network 304 uses a region of interest pooling layer to extract features from each candidate object bounding box 306. The region of interest pooling layer is an operation for extracting a small feature map (e.g., 7×7) from each region of interest. The region of interest pooling layer first quantizes a floating-number region of interest to the discrete granularity of the feature map, this quantized region of interest is then subdivided into spatial bins which are themselves quantized, and finally feature values covered by each bin are aggregated (e.g., by max pooling).

This quantization can have a negative effect on predicting pixel-accurate masks. Accordingly, the Mask R-CNN includes a mask network 312, which is a fully-convolutional neural network layer that includes a region of interest alignment layer. The region of interest alignment layer removes the quantization of the region of interest pooling layer, properly aligning the extracted features with the input candidate object bounding boxes. More specifically, the region of interest alignment layer avoids any quantization of the region of interest boundaries or bins. The mask network 312 operates analogous to the bounding box regression operations of the Fast R-CNN 304, except that the mask network 312 employs the region of interest alignment layer rather than the region of interest pooling layer. The region of interest alignment layer uses bilinear interpolation to compute the exact values of the input features at a particular number (e.g., four) regularly sampled locations in each region of interest bin, and aggregates the result (e.g., using a maximum or averaging operation). The mask network 312 predicts an m×m object mask from each region of interest, allowing each layer in the mask network 312 to maintain the explicit m×m object spatial layout without collapsing it into a vector representation that lacks spatial dimensions. The Mask R-CNN is trained to detect objects that are teeth regions, as discussed in more detail below. Accordingly, the mask network 312 outputs these predicted m×m object masks as teeth region masks 314. Each of these object masks encodes the spatial location of a teeth region, and is also referred to as a teeth region mask.

Additional information describing the Mask R-CNN can be found in "Mask R-CNN" to K. He, G. Gkioxari, P. Dollar, and R. Girshick, arXiv:1703.06870, 2018, which is hereby incorporated by reference herein in its entirety.

Figure 4:
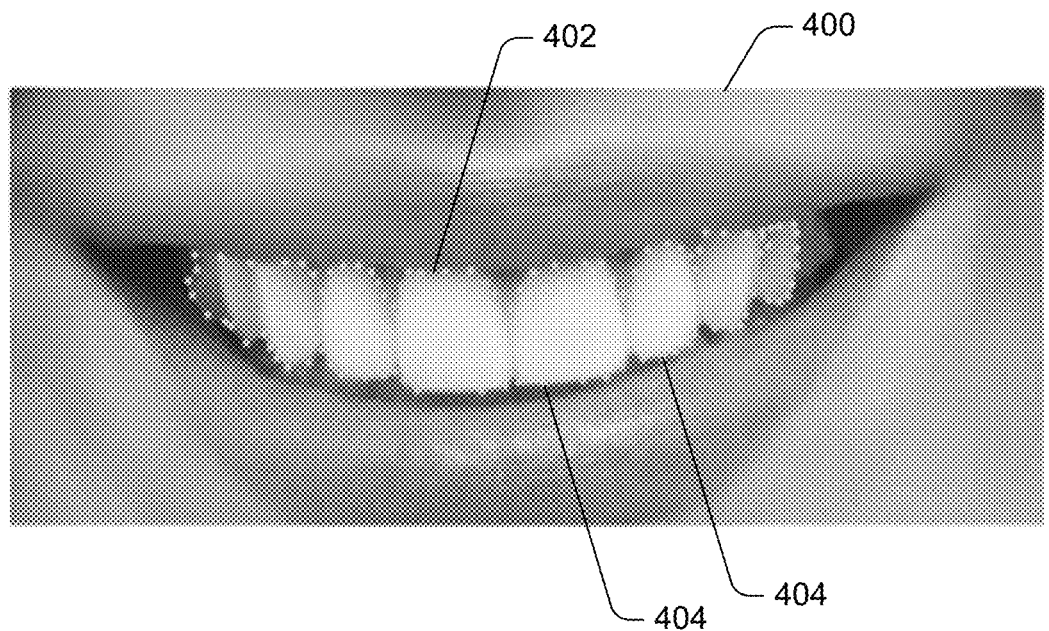
FIG. 4 illustrates an example training image in a set of training images.

The machine learning system employed by the teeth region detection module 134 is trained on a set of training images that include teeth enclosed in a polygon, and a bounding box around those teeth. A sample of points corresponding to the boundary of the polygon is taken, making sure to exclude gingiva or empty regions (e.g., regions that are dark because of missing teeth, because of a slight opening of the mouth or lips, and so forth). These polygons and samples of points can be generated in various different manners, such as manually by a user of the machine learning system. For each image in the set of training images, the polygon and sample of points serve as the ground truth for the teeth region mask in the training image, and the bounding box around those teeth serves as the ground truth for the teeth region bounding box in the training image. FIG. 4 illustrates an example training image 400 in the set of training images. The training image 400 includes teeth enclosed in a polygon 402, with sample points 404 along the polygon.

The machine learning system employed by the teeth region detection module 134 is trained to generate the teeth region mask 202 and the bounding box for the teeth region mask 202. The machine learning system is trained, for example, by updating weights of filters in the region proposal network 302, the Fast R-CNN 304, and the mask network 312 to minimize the loss between the known teeth regions and teeth region bounding boxes for the training images, and between the known teeth regions and teeth region bounding boxes generated by the machine learning system 300 for the training images. Various different loss functions can be used in training the machine learning system.

In one or more implementations, the machine learning system employed by the teeth region detection module 134 is trained using one or more of four different loss functions, referred to as mask loss, regression loss, classification loss, and teeth pixel gradient loss. The machine learning system is considered trained, and the training of the machine learning system stops, when each of these four different loss functions converges. A loss function is considered to converge when the result of the loss function is zero or within a threshold amount of zero (e.g., 0.1 or less). These loss functions can be considered in any order, and can be sequential or concurrent. For example, for a given training image, all four loss functions can be calculated. By way of another example, the machine learning system may be trained using the mask loss function for a particular amount of time (e.g., 1000 images), followed by using the regression loss function for the next particular amount of time (e.g., the next 1000) images, followed by using the classification loss function for the next particular amount of time (e.g., the next 1000) images, followed by using the teeth pixel gradient loss function for the next particular amount of time (e.g., the next 1000) images, followed by using the mask loss function for the next particular amount of time (e.g., the next 1000) images, and so forth.

The mask loss is a binary cross-entropy loss and compares, for an image in the set of training images, how close the predicted mask generated by the machine learning system is to the ground truth for the teeth region mask for the image. Convergence of the mask loss helps ensure that the machine learning system has learned to generate accurate teeth region masks matching exact teeth contours in the set of training images.

The regression loss is a binary cross-entropy loss and compares, for an image in the set of training images, how close the bounding box generated by the machine learning system is to the ground truth bounding box for the image. Convergence of the regression loss helps ensure that the machine learning system has learned to generate accurate teeth region bounding boxes matching teeth region bounding boxes in the set of training images.

The classification loss is a binary cross-entropy loss and compares, for an image in the set of training images, how close the class label generated by the machine learning system is for a candidate bounding box to the ground truth class label for the candidate bounding box. The ground truth class label for the bounding box is known based on the ground truth bounding box for the image. For example, the ground truth class label is "teeth" if the candidate bounding box is the same (or within a threshold amount of being the same, such as covering at least 95% of the same area) as the ground truth bounding box for the image, and is "not teeth" if the candidate bounding box is not the same (or is not within a threshold amount of being the same, such as covering at least 95% of the same area) as the ground truth bounding box for the image). Convergence of the classification loss helps ensure that the machine learning system has learned to generate accurate teeth region bounding boxes matching teeth region bounding boxes in the set of training images.

The teeth pixel gradient loss is based on a teeth pixel gradient value L', that measures the gradient of probability and the Hessian at points in the candidate bounding box. The teeth pixel gradient value L' allows pixel differentials at particular points (based on the Hessians of the particular points) and probability gradients at particular points to be factored into the training of the machine learning system. The value L' is defined as:

$$L' = \sum_{\forall (x,y)} \|GC(x, y) - \lambda GP(x, y)\| + \|HC(x, y) - \mu HP(x, y)\|$$

where: c(x,y) is the color vector at point (x,y), vc (x,y) is the L2 norm of the color vector at point (x,y), GC (x,y)=∇vc (x,y) is the gradient of the color value at point (x,y), HC(x,y)=H(c)(x,y) is the Hessian of the color value at point (x,y), p(x,y) is the probability predicted at a point (x,y) for being part of the teeth region mask, GP(x,y)=∇p(x,y) is the gradient of the probability value at the point (x,y), and HP(x,y)=H(p)(x,y) is the Hessian of the probability predicted at the point (x,y) for being part of the teeth region mask. In L', λ and μ are constants to account for scale variance between the probability and color spaces.

The teeth pixel gradient loss is the difference between the value L' calculated over the teeth region mask generated by the machine learning system and the value L' calculated over the ground truth teeth region mask. Convergence of the teeth pixel gradient loss helps maintain closeness in pixel differentials and mask probability gradients in the generated teeth region masks.

Figure 5:
FIG. 5 illustrates an example of a teeth region detected by a teeth region detection module.
Figure 5:
Figure 5:
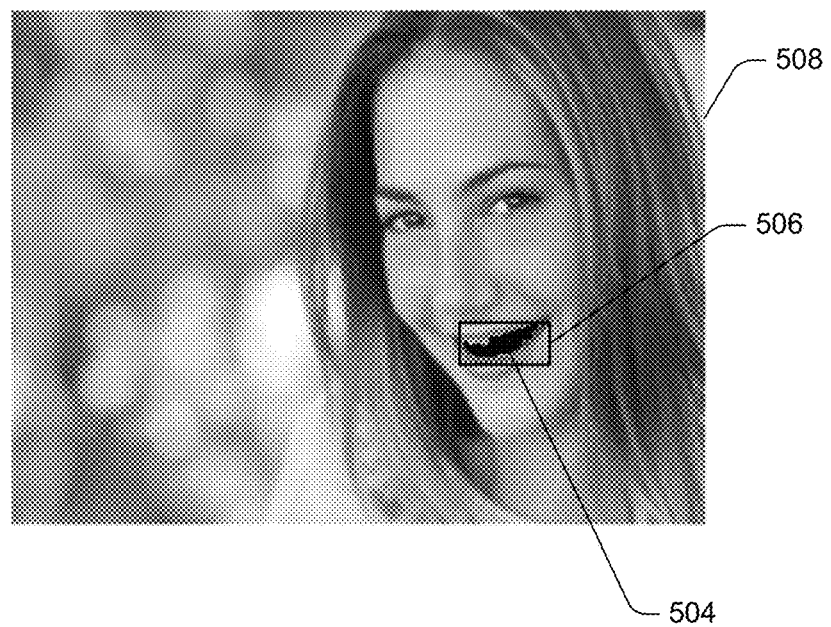

FIG. 5 illustrates an example 500 of a teeth region detected by the teeth region detection module 134. Digital content 106 that is a digital image 502 is illustrated. The teeth region detection module 134 detects a teeth region 504 and a bounding box 506 around the teeth region 504 as illustrated in digital image 508.

Returning to FIG. 3, the Fast R-CNN 304 is discussed as identifying the candidate object as one of two classes (one for "teeth", the other for "not teeth"). Additionally or alternatively, additional classes can be used, such as classes identifying different types of teeth (e.g., anterior, posterior, incisors, canine, premolar, etc.), classes identifying different types of dental work (e.g., tooth clip, golden teeth, teeth prosthesis, teeth tapering, teeth crowns, etc.), and so forth. In such situations, user input can be received identifying which classes of teeth the user desires to whiten. For example, the user could select incisors, and in response the automatic teeth whitening system 104 applies whitening to only those teeth in the teeth region classified as incisors. By way of another example, the user could select golden teeth, and in response the automatic teeth whitening system 104 applies whitening to only those teeth in the teeth region classified as golden teeth.

Returning to FIG. 2, the tooth edge detection module 136 implements functionality to detect edges of individual teeth within each teeth region detected by the teeth region detection module 134. The tooth edge detection module 136 receives the cropped portion of digital content 204 and the teeth region mask 202 from the teeth region detection module 134. The tooth edge detection module 136 uses a machine learning system to find the visual structure of each tooth in the teeth region as identified by the teeth region mask 202. Generally, the tooth edge detection module 136 detects the outer layout corresponding to each tooth in the teeth region, which provides the tooth's shape. The tooth edge detection module 136 generates and outputs a tooth segmentation drawing 204 that identifies where each individual tooth is in the teeth region as identified by the teeth region mask 202.

Figure 6:
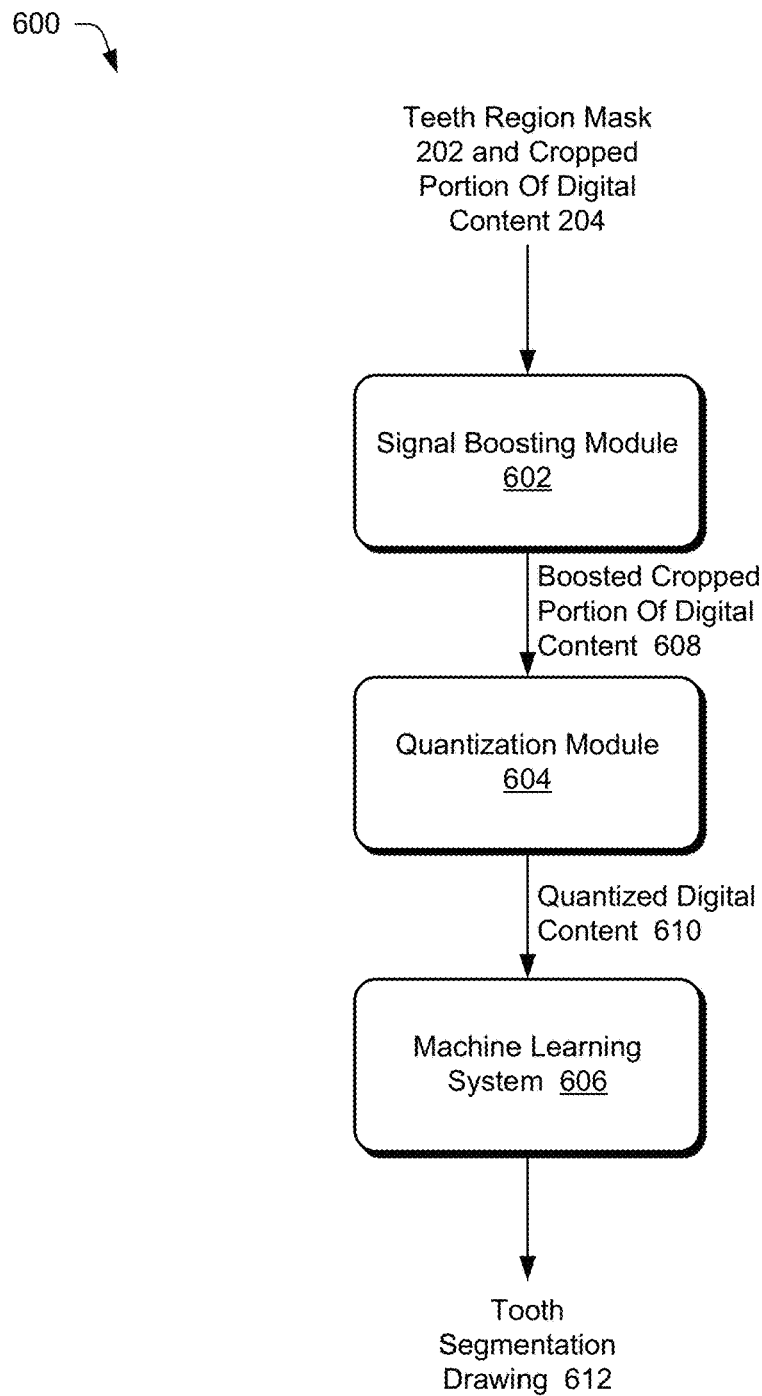
FIG. 6 illustrates an example implementation of a tooth edge detection module.

FIG. 6 illustrates an example implementation of a tooth edge detection module 600, which is an example implementation of the tooth edge detection module 136. In the example of FIG. 6, the tooth edge detection module 600 includes a signal boosting module 602, a quantization module 604, and a machine learning system 606.

The signal boosting module 602 receives the cropped portion of digital content 204 and the teeth region mask 202, and generates a boosted cropped portion of digital content 608. In situations in which gingiva or empty areas are at the boundary of a tooth, the boundary of the tooth is easier for the machine learning system 606 to detect. However, in situations in which two teeth are tightly packed together, or the gingiva between two teeth is thin, it can be harder for the machine learning system 606 to detect the boundary between the two teeth. The signal boosting module 602 attempts to change the intensity of pixels at these boundaries so that the machine learning system 606 can more easily detect the boundaries between teeth.

The signal boosting module 602 determines a potential value for each pixel in the teeth region. So, assuming pixel values at location i=(x,y), where x, y are horizontal, vertical coordinates, is (r,g,b), then the potential is referred to as $V_i$ (r,g,b). Each of these values r, g, b are in the range of 0 to 255. This setting of potential is a Markov Random Field setting.

Pixels in a teeth region that are close to being white will have r, g, b values close to 255. However, pixels in a teeth region that are nearer to gingiva have a color pattern that is specific to the particular person, such as red, brown, or pink. Pixels in a tooth region that are closer to gaps between teeth or where two teeth touch each other have lower r, g, b values than pixels of teeth that are close to being white. Accordingly, from the middle of a tooth to the tooth edge, there is typically a pattern of decreasing pixel values. The signal boosting module 602 leverages this characteristic of teeth. In some situations, the gap between two teeth may be only 3 or 4 pixels in the horizontal direction. Referring to the height of a tooth as L, the decrease in pixel values at the edge of the tooth is bound to ⅔ of the height L and a width W where W is typically in the range of 3 to 10 pixels. The signal boosting module 602 boosts the signal in this region, ⅔LW, by decreasing the pixel values in this region.

The signal boosting module 602 performs k-means clustering, where k=3, to divide pixels into three zones. The radius of each k-means constellation is determined and a maximum of pixel values that are at distance of 0.95*r, where r is the radius of each constellation (the maximum distance from the center), is calculated. Pixels having larger pixel values are expected to have more energy (and thus larger potential) and pixels having smaller pixel values are expected to have less energy (and thus smaller potential). This gives an ordering to maximum pixel values at each constellation center. These constellations can be referred to as A, B, C, the centers of these constellations can be referred to as $C_A$, $C_B$, $C_C$, and maximum pixel values at 0.95*r can be referred to as $P_A$, $P_B$, $P_C$. Potential values for a location i, which belongs to Constellation A is given as:

$$V_i(r,g,b) = P_A(1+d((r,g,b)-C_A) + P_B(d((r,g,b)-C_B) + P_C(d((r,g,b)-C_C))$$

where d is Euclidean distance.

The signal boosting module 602 finds all neighbors of a location that are at distance less than R in the horizontal or vertical dimension. These points form a neighboring system, $N_i$, in Markov Random Field setting. The energy of a location is calculated as:

$$U_i(r,g,b)=V_i(r,g,b)+\Sigma_{i'\in N_i}D(i,i')^{1/2}V_{i'}(r,g,b)$$

where D(i, i') is spatial distance function. The square root of D(i, i') is used in order to have less diminishing effect of neighboring points.

The probability of a pixel location being on an edge of a tooth is defined by deploying Boltzmann Distribution as $$P(i) = \frac{1}{Z}e^{-\frac{1}{T}U_i(r,g,b)}$$

where Z is a normalization constant, and T is a suitable coefficient. The signal boosting module 602 reduces RGB values of pixels in the cropped portion of digital content 204 that have a probability of belonging to an edge that is at least a threshold amount (e.g., 80%) to make the intensity of those pixels lower and the pixel colors further from being white. This reduction can be performed in various different manners, such as reducing the values of the RGB pixels by a fixed amount (e.g., by 25 if pixel values range from 0 to 255), reducing the values of the RGB pixels by a variable amount (e.g., by 20% of their current values), and so forth. The signal boosting module 602 outputs the cropped portion of digital content 204 with the reduced RGB values of pixels at the edges as the boosted cropped portion of digital content 608.

The quantization module 604 receives the boosted cropped portion of digital content 608 and generates quantized digital content 610. The quantization module 604 generates the quantized digital content 610 by quantizing the teeth region mask 202. The teeth region mask 202 is quantized, for example, by taking the Hadamard Matrix product of the portion of digital content 204 and the cropped portion of digital content 204.

The machine learning system 606 receives the quantized digital content 610 and generates a tooth segmentation drawing 612 that identifies where each individual tooth is in the teeth region as identified by the teeth region mask 202. This tooth segmentation drawing 612 is, for example, the tooth segmentation drawing 206 of FIG. 2. The machine learning system 606 can be implemented using various different machine learning techniques. For example, the machine learning system 606 can employ one or more CNNs.

One example of a machine learning system that can be used to implement the machine learning system 606 is a neural network based holistic edge detector. A neural network based holistic edge detector is a single stream deep CNN with multiple side outputs. For example, the depth can be 16-19 weight layers. The neural network based holistic edge detector performs image-to-image prediction by means of a deep learning model that leverages fully-convolutional neural networks and deeply-supervised nets. The neural network based holistic edge detector automatically learns rich hierarchical representations (guided by deep supervision on side responses) to resolve the ambiguity in edge and object boundary detection.

The neural network based holistic edge detector is trained to generate a tooth segmentation drawing using a set of training images that are tooth segmentation drawings of portions of digital content that include teeth regions. The machine learning system is trained, for example, by updating weights of filters in the fully-convolutional neural networks of the machine learning system to minimize the loss between the known teeth edges in the set of training images and the tooth segmentation drawings generated by the neural network based holistic edge detector.

Additional information describing the holistic edge detector can be found in "Holistically-Nested Edge Detection" to Saining Xie, Zhuowen Tu., arXiv:1504.06375, 2015, which is hereby incorporated by reference herein in its entirety.

Returning to FIG. 2, the automatic teeth whitening system 104 is illustrated as generating the teeth region mask 202 and the cropped portion of digital content 204 prior to generating the tooth segmentation drawing 206. Additionally or alternatively, the tooth segmentation drawing 206 can be generated prior to generating the teeth region mask 202 and the cropped portion of digital content 204. For example, the tooth edge detection module 138 can operate on the digital content 106 (rather than the cropped portion of digital content 204) to generate the tooth segmentation drawing 206. Then, the teeth region detection module 134 can generate the teeth region mask 202 and the cropped portion of digital content 204. In such situations the teeth region detection module 134 can detect the teeth region as discussed above, or can receive indications or hints of the location of a teeth region based on the tooth segmentation drawing 208.

The selective generative whitening module 138 implements functionality to automatically whiten the teeth within each teeth region detected by the teeth region detection module 134. The selective generative whitening module 138 receives the cropped portion of digital content 204 and the tooth segmentation drawing 206 from the tooth edge detection module 136. The selective generative whitening module 138 whitens the teeth within each teeth region detected by the teeth region detection module 134, and outputs the whitened teeth as whitened teeth digital content 208. Generally, the selective generative whitening module 138 generates an intensity map by filling each segment in the tooth segmentation drawing 206 (each segment corresponding to a tooth) with the average intensity of pixels inside that segment in the cropped portion of digital content 204. The selective generative whitening module 138 also uses a machine learning system to generate intermediate whitened teeth from the cropped portion of digital content 204. The intermediate whitened teeth are combined with the cropped portion of digital content 204 based on the average intensity values of the corresponding segments. Thus, rather than giving each tooth in the teeth region the same intensity, each tooth in the teeth region is whitened based on the average intensity of pixels that make up that tooth in the cropped portion of digital content 204.

Figure 7:
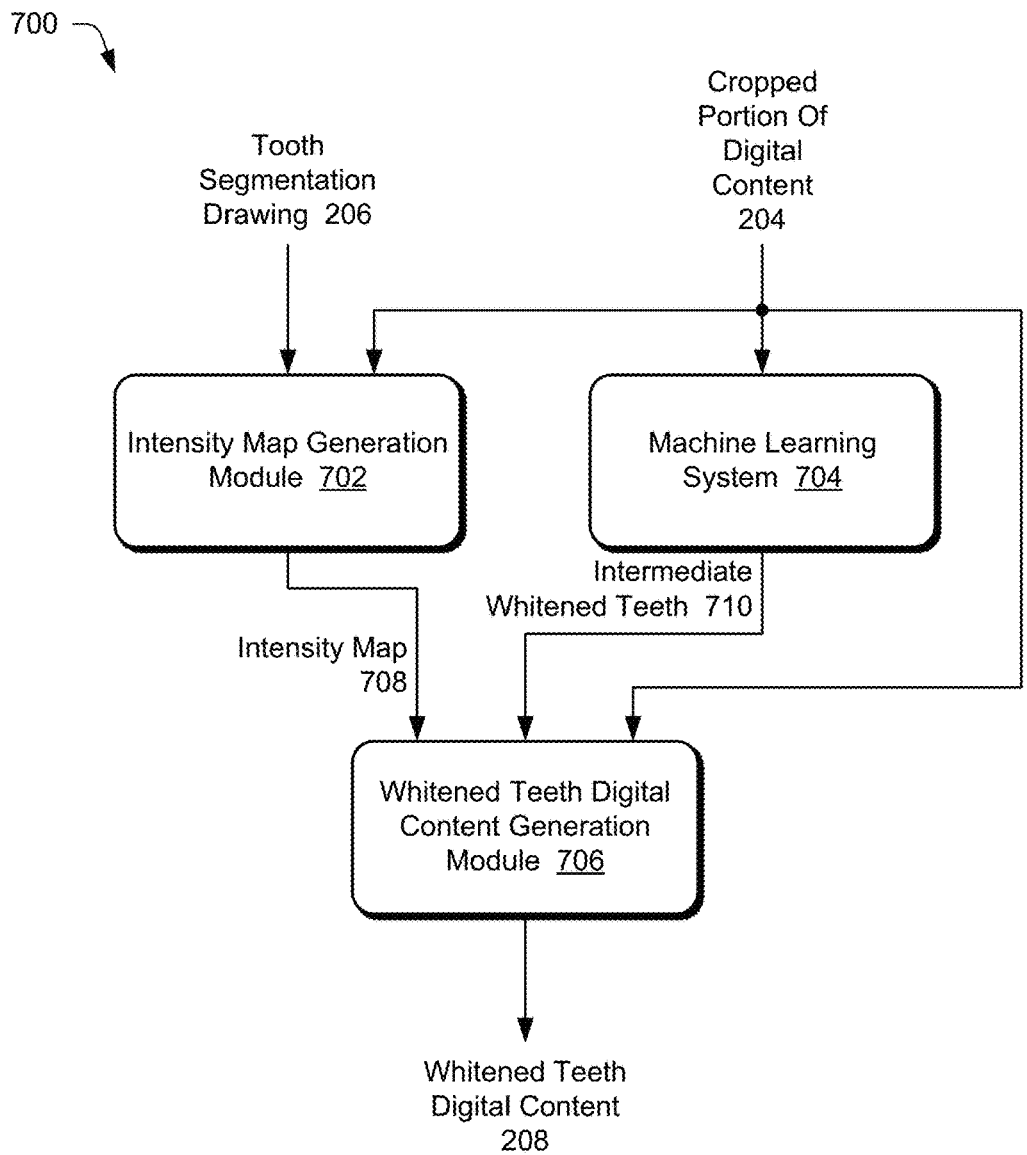
FIG. 7 illustrates an example implementation of a selective generative whitening module.

FIG. 7 illustrates an example implementation of a selective generative whitening module 700, which is an example implementation of the selective generative whitening module 138. In the example of FIG. 7, the selective generative whitening module 700 includes an intensity map generation module 702, a machine learning system 704, and a whitened teeth digital content generation module 706.

The intensity map generation module 702 receives the cropped portion of digital content 204 and the tooth segmentation drawing 206, and generates an intensity map 708. The intensity map 708 is an identification of the intensities of each individual tooth in the tooth segmentation drawing 206. The intensity map generation module 702 generates the intensity map 708 by filling each segment in the tooth segmentation drawing 206 with the average intensity of the pixels inside that segment. Various different fill algorithms can be used to fill each segment with the average intensity of the pixels inside that segment, such as a flood fill algorithm. The flood fill algorithm can assume that each segment is convex, improving the speed with which the segment can be filled. Typically, each individual tooth corresponds to a segment. However, in some situations, such as where the tooth edge detection module 136 was not able to identify edges of two adjacent teeth, the intensity map generation module 702 may fill multiple teeth with the same intensity.

The average intensity $I^{avg}$ of the pixels inside a segment can be calculated in various manners. For example, average intensity $I^{avg}$ can be calculated as follows:

$$I^{avg} = \sum_{\forall(x,y)} \frac{(R(x, y) + G(x, y) + B(x, y))}{3}$$

where R (x,y) is the red pixel value at point (x,y) within the segment, G (x,y) is the green pixel value at point (x,y) within the segment, and B (x,y) is the blue pixel value at point (x,y) within the segment. Thus, the average intensity $I^{avg}$ for a segment of the intensity map 708 is calculated by averaging pixel color values across the tooth in that segment.

Figure 8:
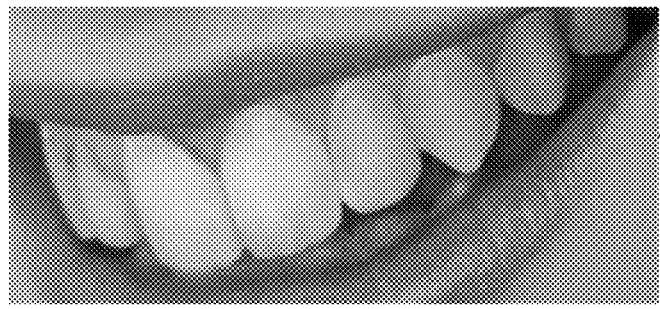
FIG. 8 illustrates an example of a cropped portion of digital content, a tooth segmentation drawing, and an intensity map.
Figure 8:
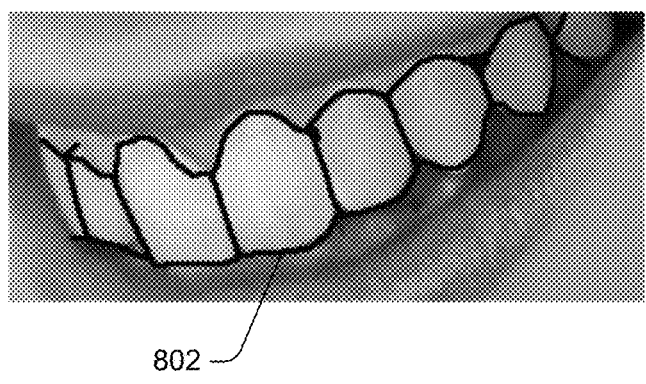
Figure 8:
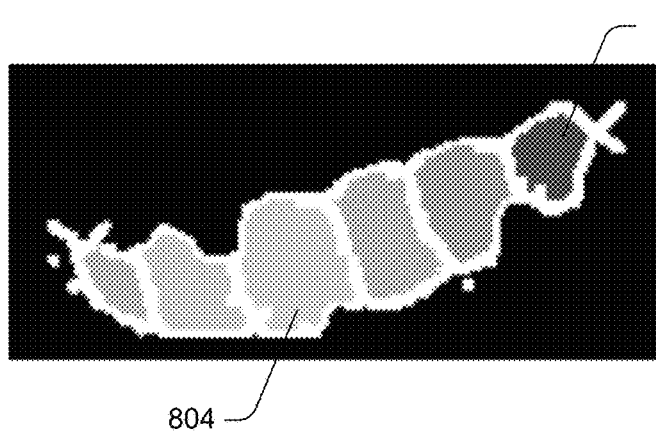

FIG. 8 illustrates an example 800 of a cropped portion of digital content 204, a tooth segmentation drawing 206, and an intensity map 708. The tooth segmentation drawing 206 includes lines 802 illustrating the outlines of each individual tooth that the tooth edge detection module 136 was able to identify. The intensity map 708 illustrates different intensities for each segment. For example, segment 804 has a different intensity than segment 806.

Returning to FIG. 7, the machine learning system 704 receives the cropped portion of digital content 204 and generates intermediate whitened teeth 710. In one or more implementations, the machine learning system 704 generates the intermediate whitened teeth 710 using a generative adversarial network (GAN) that is an unpaired GAN. The GAN receives the cropped portion of digital content 204 as an input, and transforms that input from a domain of non-white teeth to a domain of white teeth, and outputs the transformed cropped portion of digital content 204 as the intermediate whitened teeth 710. The output of the machine learning system 704 is referred to as "intermediate" because additional processing is performed by the whitened teeth digital content generation module 706 to generate the whitened teeth digital content 208 as discussed in more detail below.

A GAN learns a mapping from input image to output image, translating the input image into a corresponding output image. A GAN includes two neural networks (such as CNNs), one referred to as the generator model and one referred to as the discriminator model. The generator model is trained to generate images that fool the discriminator model (e.g., cause the discriminator model to determine that the generated image was actually a real captured image rather than an image generated by the generator model). The discriminator model is trained to detect whether an image is a real captured image or an image generated by the generator model.

The GAN is trained using two sets of training data. Each set is also referred to as a domain. One domain is the source domain and includes images of teeth that are non-white, such as yellow teeth, dirty teeth, teeth with crowns, teeth with caps, and so forth. The other domain is the target domain and includes images of all white and clean teeth. The GAN is trained to translate an image A from the source domain to the target domain as translated image B so that the translated image B is indistinguishable from the training images in the target domain using a forward cycle-consistency loss. The GAN is further trained to translate the translated image B back into the source domain so that this translated-back image C is the same as the image A using a backward cycle-consistency loss. Training the GAN using these two cycle-consistency losses preserves structural features in the teeth as well as the domain (e.g., either white or non-white), so the intermediate whitened teeth 710 look the same as the teeth in the cropped portion of digital content 204 except whitened.

Additional information describing the GAN can be found in "Unpaired Image-to-Image Translation using Cycle-Consistent Adversarial Networks" to J.-Y. Zhu, T. Park, P. Isola, and A. A. Efros, International Conference on Computer Vision, 2017, and "Image-to-Image Translation with Conditional Adversarial Networks" to P. Isola, J.-Y. Zhu, T. Zhou, and A. A. Efros, CVPR, 2017, both of which are hereby incorporated by reference herein in their entirety.

Although the machine learning system 704 is discussed as being implemented as a GAN, additionally or alternatively various other generative machine learning systems can be used. For example, the machine learning system 704 can be implemented using one or more conditional GANs, one or more Disentangled Representation learning-Generative Adversarial Network (DR-GANs), one or more variational autoencoders (VAEs), and so forth.

The whitened teeth digital content generation module 706 receives the cropped portion of digital content 204, the intensity map 708, and the intermediate whitened teeth 710, and generates the whitened teeth digital content 208. The whitened teeth digital content generation module 706 generates the whitened teeth digital content 208 by combining the intermediate whitened teeth digital 710 with the cropped portion of digital content 204 based on the average intensity values of the corresponding segments in the intensity map 708. Thus, rather than giving each tooth in the teeth region the same intensity, each tooth in the teeth region is whitened based on the average intensity of pixels that make up that tooth in the cropped portion of digital content 204. Using the intermediate whitened teeth 710 helps in whitening the teeth in the cropped portion of digital content 204 and increasing the intensity values of the teeth in the cropped portion of digital content 204, while using the teeth in the cropped portion of digital content 204 helps in preserving some of the finer details inside the teeth in the cropped portion of digital content 204. For example, the texture of a tooth, such as how the RGB values change over the tooth, is maintained.

The intensity map indicates the ratio at which the values of teeth in the cropped portion of digital content 204 are used relative to the values of teeth in the intermedia whitened teeth 710. For example, for each segment in the intensity map 708, the RGB color of the corresponding tooth in the whitened teeth digital content 208 is calculated using the color of the tooth in the cropped portion of digital content 204 and the color of the tooth in the intermediate whitened teeth 710 as follows:

$$R^{wt}(x, y) = \left(\frac{R^{im}}{255}\right) R^{cp}(x, y) + \left(1 - \frac{R^{im}}{255}\right) R^{it}$$

-continued $$G^{wt}(x, y) = \left(\frac{G^{im}}{255}\right)G^{cp}(x, y) + \left(1 - \frac{G^{im}}{255}\right)G^{it}$$

$$B^{wt}(x, y) = \left(\frac{B^{im}}{255}\right)B^{cp}(x, y) + \left(1 - \frac{B^{im}}{255}\right)B^{it}$$

where $R^{wt}$ (x,y) is the red pixel value at point (x,y) in the whitened teeth digital content 208, $R^{im}$ is the red pixel value for the segment in the intensity map 708, $R^{cp}$ (x,y) is the red pixel value at point (x,y) in the cropped portion of digital content 204, $R^{it}$ is the red pixel value at point (x,y) in the intermediate whitened teeth 710, $G^{wt}$ (x,y) is the green pixel value at point (x,y) in the whitened teeth digital content 208, $G^{im}$ is the green pixel value for the segment in the intensity map 708, $G^{cp}$ (x,y) is the green pixel value at point (x,y) in the cropped portion of digital content 204, $G^{it}$ is the green pixel value at point (x,y) in the intermediate whitened teeth 710, $B^{wt}$(x,y) is the blue pixel value at point (x,y) in the whitened teeth digital content 208, $B^{im}$ is the blue pixel value for the segment in the intensity map 708, $B^{cp}$ (x,y) is the blue pixel value at point (x,y) in the cropped portion of digital content 204, and $B^{it}$ is the blue pixel value at point (x,y) in the intermediate whitened teeth 710.

The selective generative whitening module 138 can generate the whitened teeth digital content 208 in any of a variety of different data formats. For example, the selective generative whitening module 138 can change the pixel values of the teeth in the obtained digital content 106 and overwrite the obtained digital content 106 with the whitened teeth. By way of another example, the selective generative whitening module 138 can add a layer to the digital content 106 that overlays the teeth in the digital content 106 with the whitened teeth. By way of yet another example, the selective generative whitening module 138 can change the pixel values of the teeth in the obtained digital content 106 and save the obtained digital content 106 with whitened teeth as new digital content.

The output module 140 implements functionality to output the whitened teeth digital content 208. The output module 140 can output the whitened teeth digital content 208 in various different manners, such as displaying the whitened teeth digital content 208, communicating the whitened teeth digital content 208 to a different system or device, storing the whitened teeth digital content 208 in a storage device, and so forth.

Figure 9:
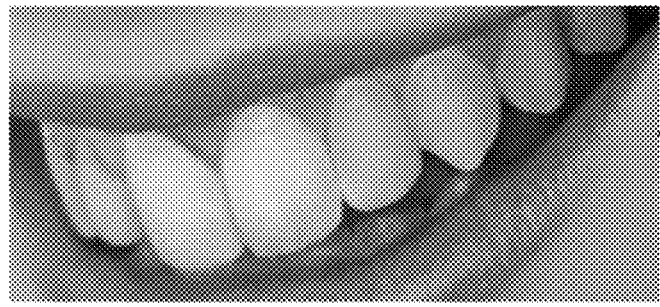
FIG. 9 illustrates an example of a cropped portion of digital content, an intensity map, intermediate whitened teeth, and the resultant whitened teeth digital content.
Figure 9:
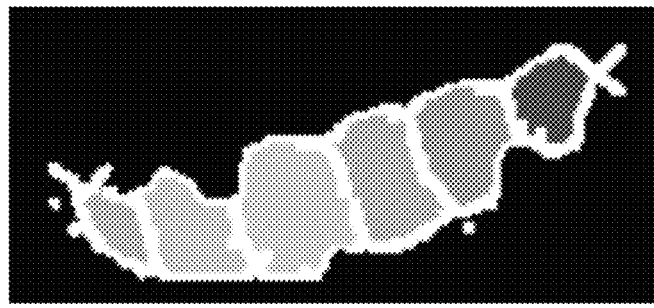
Figure 9:
Figure 9:
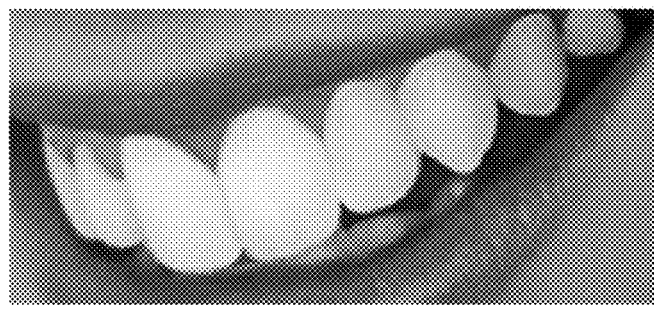

FIG. 9 illustrates an example 900 of a cropped portion of digital content 204, an intensity map 708, intermediate whitened teeth 710, and the resultant whitened teeth digital content 208.

Returning to FIG. 2, the automatic teeth whitening system 104 thus automatically whitens teeth in teeth regions of digital content. The automatic teeth whitening system 104 can automatically whiten teeth in a single teeth region of the digital content 106, or in situations in which there are multiple teeth region in the digital content 106 the automatic teeth whitening system 104 can automatically whiten the teeth in multiple regions (e.g., all regions) of the digital content 106. The automatic teeth whitening system 104 can also automatically whiten teeth in sets or collections of images. For example, a folder of digital still images can be identified to the automatic teeth whitening system 104, which can automatically whiten teeth in all of the digital still images in that folder (e.g., by obtaining the digital still images one by one).

The automatic teeth whitening system 104 can also automatically whiten teeth in digital video. Each frame of the digital video can be treated as a digital still image, and the automatic teeth whitening system 104 can automatically whiten the teeth in each frame of the digital video.

In the discussions above, the automatic teeth whitening system 104 is described as whitening all of the teeth in a teeth region. Additionally or alternatively, a user can select one or more particular teeth and the automatic teeth whitening system 104 automatically whitens only the selected one or more particular teeth. The user can select one or more particular teeth in various manners, such as by touching a location(s) of at least one tooth displayed on a display device, using a cursor control device to click on a location where at least one tooth is displayed on a display device, and so forth. The automatic teeth whitening system 104 can then use the intensity map 708, intermediate whitened teeth 710, and cropped portion of digital content 204 to generate whitened teeth digital content 208 for only the one or more particular teeth. For example, the user could select a gold tooth in a teeth region as the one tooth to be whitened by the automatic teeth whitening system 104.

Similarly, in situations in which the digital content 106 includes multiple teeth region, a user can optionally select one or more particular teeth regions and the automatic teeth whitening system 104 automatically whitens only the selected one or more particular teeth regions. The user can select one or more particular teeth regions in various manners, such as by touching a location(s) of at least one teeth region displayed on a display device, using a cursor control device to click on a location where at least one teeth region is displayed on a display device, and so forth. The automatic teeth whitening system 104 then generates whitened teeth digital content 208 for only the one or more particular teeth regions.

The techniques discussed herein refer to automatically whitening teeth in a teeth region. However, it should be noted that the techniques discussed herein can be applied analogously to automatically color teeth a different color. For example, the techniques discussed herein can be used to automatically make teeth more red, more black, more gold, and so forth.

It should also be noted that the techniques discussed herein can be used to help identify medical issues with teeth. For example, the difference between the teeth in the digital content 106 and the whitened teeth digital content 208 can be determined. If this difference is large, it may be indicative of a medical issue. This difference can be determined in various manners, such as by summing the differences in pixel values of a teeth region in the whitened teeth digital content 208 and the corresponding teeth region in the digital content 106. If this difference exceeds a threshold amount (e.g., a fixed value such as 25,000, or a variable value such as 10% of the sum of the pixel values in the corresponding teeth region in the digital content 106), then the teeth region can be identified as being a potential medical issue.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-9.

Figure 10:
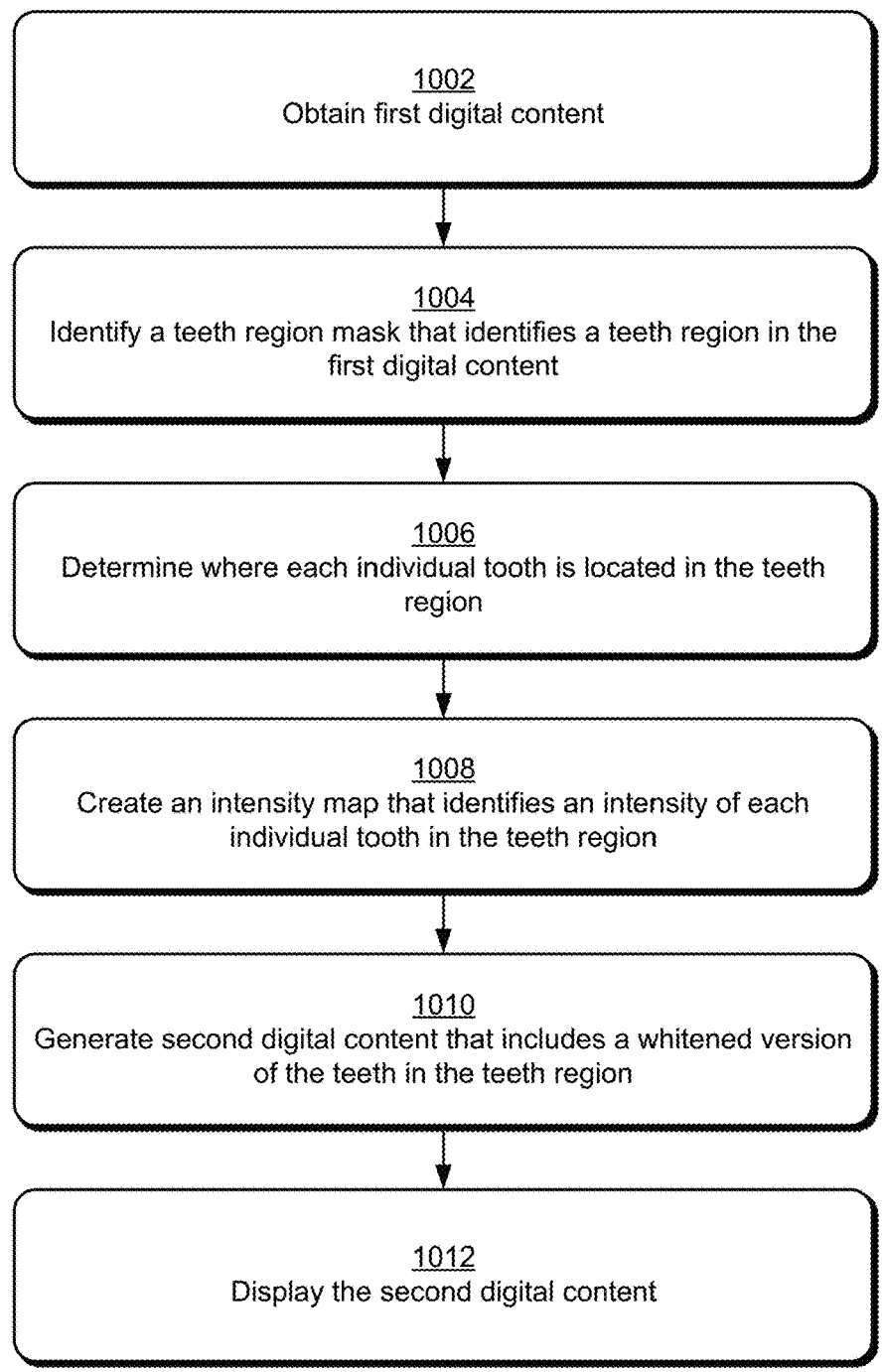
FIG. 10 is a flow diagram depicting a procedure in an example implementation of automatic teeth whitening using teeth region detection and individual tooth location.

FIG. 10 is a flow diagram depicting a procedure in an example implementation of automatic teeth whitening using teeth region detection and individual tooth location. In this example, first digital content is obtained (block 1002). The digital content can be obtained from one or more of a variety of different sources, such as from storage 108, from a camera or other image capture device of the computing device 102, from a remote storage device (e.g., accessed via the network 118), and so forth.

A teeth region mask is identified (block 1004). The teeth region mask identifies a teeth region of the first digital content that includes teeth (e.g., of a person). A cropped portion of the first digital content can also be identified. The cropped portion of the first digital content includes the teeth region (and thus the teeth), and is, for example, a bounding box around the teeth region.

Where each individual tooth is located in the teeth region is determined (block 1006). Where each individual tooth is located in the teeth region can be identified using a tooth segmentation drawing. The tooth segmentation drawing is determined based on the cropped portion of the first digital content and the teeth region mask.

An intensity map that identifies an intensity of each individual tooth in the teeth region is created (block 1008). The intensity of each individual tooth is based on, for example, the RGB values of the pixels that include (e.g., display) the tooth. The intensity map can be created based on the cropped portion of the first digital content and the tooth segmentation drawing.

Second digital content that includes a whitened version of the teeth in the teeth region is generated (block 1010). The second digital content is generated by generating, for at least one individual tooth in the tooth segmentation drawing, colors of pixels of the at least one individual tooth based on the color of each individual tooth in the first digital content as well as the intensity of the at least one individual tooth in the intensity map.

The second digital content is displayed (block 1012). Additionally or alternatively, the second digital content can be output in other manners, such as stored on a storage device, transmitted to another device or system, and so forth.

The procedure 1000 can be performed in response to any of a variety of different events. For example, the procedure 1000 can be initiated by user selection of a "whiten" option when viewing a picture (e.g., selection of a button, selection of a menu item, a gesture input on a screen, a voice command, and so forth), a user dragging and dropping digital content (or a folder containing digital content) onto an icon representing the automatic teeth whitening system or into a workspace of an automatic teeth whitening system, and so forth.

Example System and Device

Figure 11:
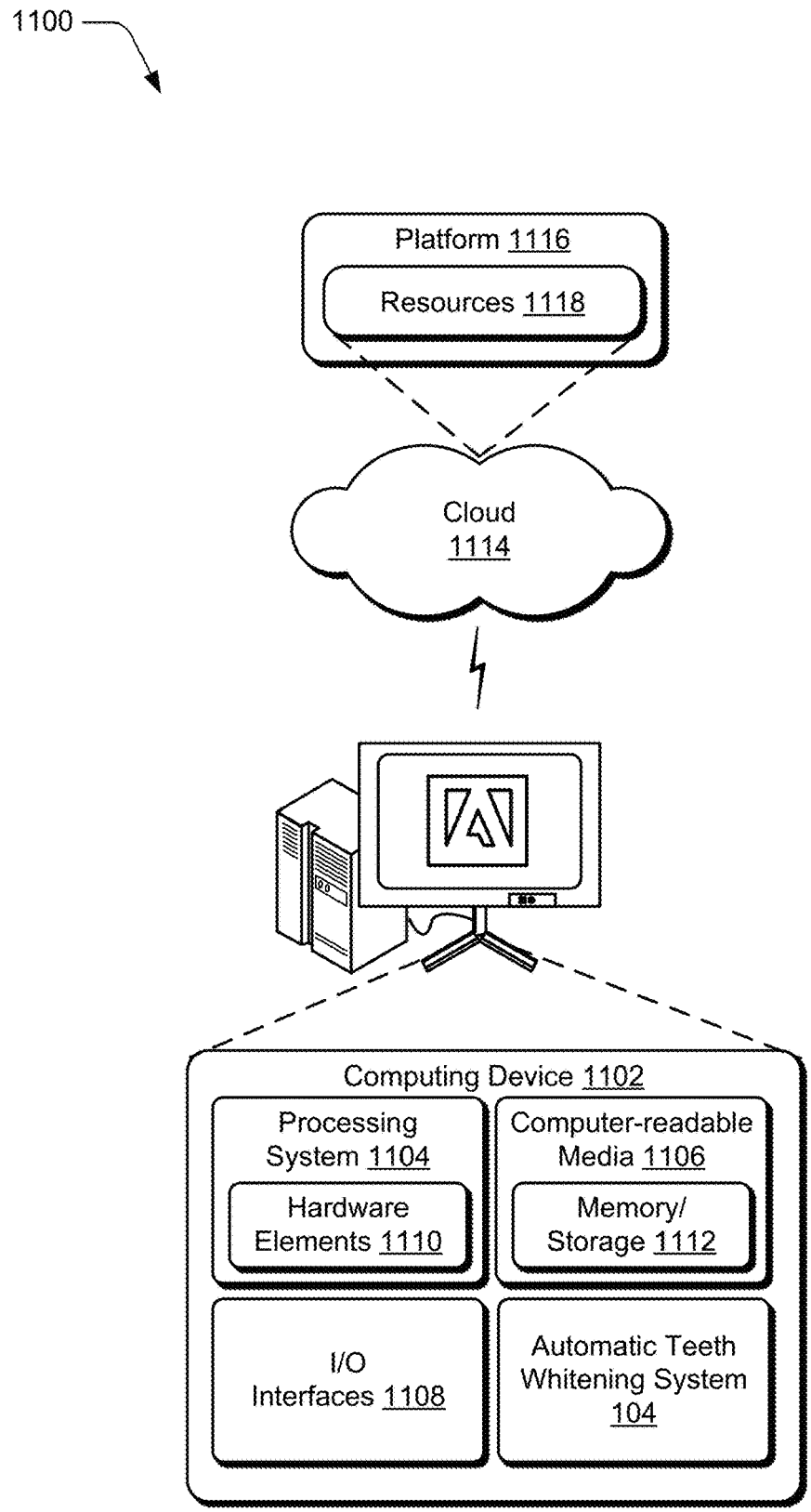
FIG. 11 illustrates an example system including various components of an example device that can be implemented as any type of computing device as described and/or utilize with reference to FIGS. 1-10 to implement aspects of the techniques described herein.

FIG. 11 illustrates an example system generally at 1100 that includes an example computing device 1102 that is representative of one or more computing systems and/or devices that may implement the various techniques described herein. This is illustrated through inclusion of the automatic teeth whitening system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to edit digital content, a method implemented by at least one computing device, the method comprising:
   obtaining first digital content;
   identifying a teeth region mask that identifies a teeth region of the first digital content that includes teeth of a person;
   determining, using the first digital content, where each individual tooth is located in the teeth region;
   creating, using the first digital content, an intensity map that identifies an intensity of each individual tooth in the teeth region, the intensity map indicating that a first individual tooth located in the teeth region has a different intensity than a second individual tooth located in the teeth region;
   generating, using a first machine learning system, second digital content that includes a whitened version of the teeth of the person, the generating second digital content including generating, for at least one individual tooth in the teeth region, colors of pixels of the at least one individual tooth based on a color of the at least one individual tooth in the first digital content as well as the intensity of the at least one individual tooth in the intensity map; and displaying the second digital content.

2. The method as recited in claim 1, the identifying the teeth region mask comprising using a second machine learning system that is trained at least in part by minimizing a teeth pixel gradient loss, the teeth pixel gradient loss being a difference between a first teeth pixel gradient value calculated over a first teeth region mask generated by the second machine learning system for a training image and a second teeth pixel gradient value calculated over a ground truth teeth region mask of the training image, the first teeth pixel gradient value measuring a gradient of probability and a Hessian at multiple points in the first teeth region mask, and the second teeth pixel gradient value measuring the gradient of probability and the Hessian at multiple points in the ground truth teeth region mask.

3. The method as recited in claim 2, the second machine learning system being further trained by minimizing a mask loss, the mask loss comprising a binary cross-entropy loss that compares, for the training image, how close the first teeth region mask generated by the second machine learning system is to the ground truth teeth region mask of the training image.

4. The method as recited in claim 1, wherein determining where each individual tooth is located in the teeth region comprises:

identifying one or more pixels that have at least a threshold probability of being at a location on an edge of a tooth in the teeth region; and reducing pixel RGB values of each of the identified one or more pixels.

5. The method as recited in claim 1, wherein generating the second digital content comprises using a generative adversarial network to generate the second digital content.

6. The method as recited in claim 1, wherein creating the intensity map comprises averaging, for each individual tooth in the teeth region, pixel color values across the individual tooth.

7. The method as recited in claim 1, wherein generating the second digital content comprises:

generating, using the first machine learning system, intermediate whitened teeth for the teeth in the teeth region, the first machine learning system having been trained to transform the teeth region from a domain of non-white teeth to a domain of white teeth; and combining, using the intensity map, the intermediate whitened teeth and the teeth located in the teeth region of the first digital content.

8. The method as recited in claim 1, further comprising repeating the identifying, determining, creating, and generating for each of one or more additional teeth regions in the first digital content.

9. The method as recited in claim 1, wherein the first digital content comprises a first digital still image of a collection of multiple digital still images, the method further comprising automatically repeating the obtaining, identifying, determining, creating, and generating for each of multiple additional digital still images in the collection of multiple digital still images.

10. The method as recited in claim 1, wherein the first digital content comprises a first frame of a digital video, the method further comprising automatically repeating the obtaining, identifying, determining, creating, and generating for each of multiple additional frames in the digital video.

11. The method as recited in claim 1, the at least one individual tooth being a single user-selected tooth.

12. In a digital medium environment to edit digital content, a computing device comprising:

a processor; and computer-readable storage media having stored thereon multiple instructions that, responsive to execution by the processor, cause the processor to perform operations comprising:

obtaining first digital content;

identifying both a teeth region mask that identifies a teeth region of the first digital content that includes teeth of a person and a cropped portion of the first digital content that includes the teeth of the person;

determining, using the cropped portion of the first digital content and the teeth region mask, a tooth segmentation drawing that identifies where each individual tooth is located in the teeth region;

creating, using the cropped portion of the first digital content and the tooth segmentation drawing, an intensity map that identifies an intensity of each individual tooth in the tooth segmentation drawing, the intensity map indicating that a first individual tooth located in the teeth region has a different intensity than a second individual tooth located in the teeth region;

generating, using a first machine learning system, second digital content that includes a whitened version of the teeth of the person, the generating second digital content including generating, for at least one individual tooth in the tooth segmentation drawing, colors of pixels of the at least one individual tooth based on a color of each individual tooth in the first digital content as well as the intensity of the at least one individual tooth in the intensity map; and displaying the second digital content.

13. The computing device as recited in claim 12, the generating the teeth region mask and the cropped portion of the first digital content comprising using a second machine learning system that is trained at least in part by minimizing a teeth pixel gradient loss, the teeth pixel gradient loss being a difference between a first teeth pixel gradient value calculated over a first teeth region mask generated by the second machine learning system for a training image and a second teeth pixel gradient value calculated over a ground truth teeth region mask of the training image, the first teeth pixel gradient value measuring a gradient of probability and a Hessian at multiple points in the first teeth region mask, and the second teeth pixel gradient value measuring the gradient of probability and the Hessian at multiple points in the ground truth teeth region mask.

14. The computing device as recited in claim 12, wherein determining the tooth segmentation drawing comprises:

identifying one or more pixels that have at least a threshold probability of being at a location on an edge of a tooth in the teeth region; and reducing pixel RGB values of each of the identified one or more pixels.

15. The computing device as recited in claim 12, wherein generating the second digital content comprises using a generative adversarial network to generate the second digital content.

16. The computing device as recited in claim 12, wherein creating the intensity map comprises averaging, for each individual tooth in the tooth segmentation drawing, pixel color values across the individual tooth.

17. The computing device as recited in claim 12, wherein generating the second digital content comprises:
- generating, using the first machine learning system, intermediate whitened teeth for the teeth in the teeth region; and
- combining, using the intensity map, the intermediate whitened teeth and the teeth located in the teeth region of the cropped portion of the first digital content, the intensity map indicating a ratio at which values of the teeth in the cropped portion of the first digital content are used relative to values of teeth in the intermediate whitened teeth.

18. A system comprising:
- an input module to obtain first digital content;
- a teeth region detection module to identify both a teeth region mask that identifies a teeth region of the first digital content that includes teeth and a cropped portion of the first digital content that includes the teeth;
- a tooth edge detection module to determine, using the cropped portion of the first digital content and the teeth region mask, a tooth segmentation drawing that identifies where each individual tooth is located in the teeth region;
- means for creating an intensity map that identifies an intensity of each individual tooth in the tooth segmentation drawing, the intensity map indicating that a first individual tooth located in the teeth region has a different intensity than a second individual tooth located in the teeth region;
- means for generating second digital content including generating, for at least one individual tooth in the tooth segmentation drawing, colors of pixels of the at least one individual tooth based on a color of each individual tooth in the first digital content as well as the intensity of the at least one individual tooth in the intensity map; and
- an output module to display the second digital content.

19. The system as recited in claim 18, wherein the means for generating the second digital content comprises using a generative adversarial network to generate the second digital content.

20. The system as recited in claim 18, wherein the means for generating the second digital content comprises:
- means for generating intermediate whitened teeth for the teeth in the teeth region, and combining, based on the intensity map, the intermediate whitened teeth and the teeth located in the teeth region of the cropped portion of the first digital content.

* * * * *